United States Patent [19]
Elkins

[11] Patent Number: 5,957,141
[45] Date of Patent: Sep. 28, 1999

[54] ADJUSTABLE TIE

[76] Inventor: Bernadette Elkins, 5012 Fairdale, Pasadena, Tex. 77505

[21] Appl. No.: 09/145,421

[22] Filed: Sep. 1, 1998

[51] Int. Cl.[6] .................................................. A45D 8/34
[52] U.S. Cl. .............................................. 132/273
[58] Field of Search .................................. 132/273, 245; 2/170, 171, 174, 200.1, 200.2, DIG. 11, 918; D2/865, 881

[56] References Cited

U.S. PATENT DOCUMENTS

| | | |
|---|---|---|
| 2,700,977 | 2/1955 | Neerup .................................. 132/273 |
| 3,000,384 | 9/1961 | Piers, Jr. . |
| 3,542,041 | 11/1970 | Mecorella .............................. 132/273 |
| 4,273,130 | 6/1981 | Simpson . |
| 4,509,214 | 4/1985 | Shea . |
| 4,999,853 | 3/1991 | Tanner . |
| 5,293,884 | 3/1994 | Chapman et al. . |
| 5,478,306 | 12/1995 | Stoner ........................................ 2/170 |
| 5,822,798 | 10/1998 | Baxley .................................... 132/273 |

FOREIGN PATENT DOCUMENTS 2050810  1/1981  United Kingdom .

*Primary Examiner*—Gene Mancene
*Assistant Examiner*—Eduardo C. Robert
*Attorney, Agent, or Firm*—Stephen R. Greiner

[57] ABSTRACT

An adjustable tie including an elongated band of buoyant, elastomeric foam. A ring is secured to one end of the band. A first fastening portion, having a dense mat of uncut loops, is secured to the top surface of the band between the ends thereof. A second fastening portion is secured to the bottom surface of the band at the end opposite that bearing the ring. The second fastening portion has a number of hooks releasably fastenable to the loops of the first fastening portion.

1 Claim, 1 Drawing Sheet

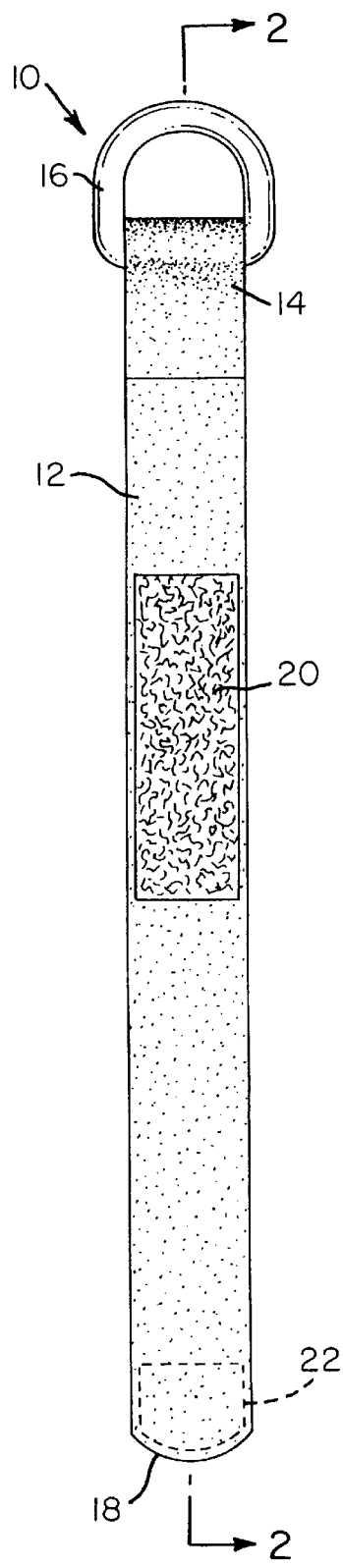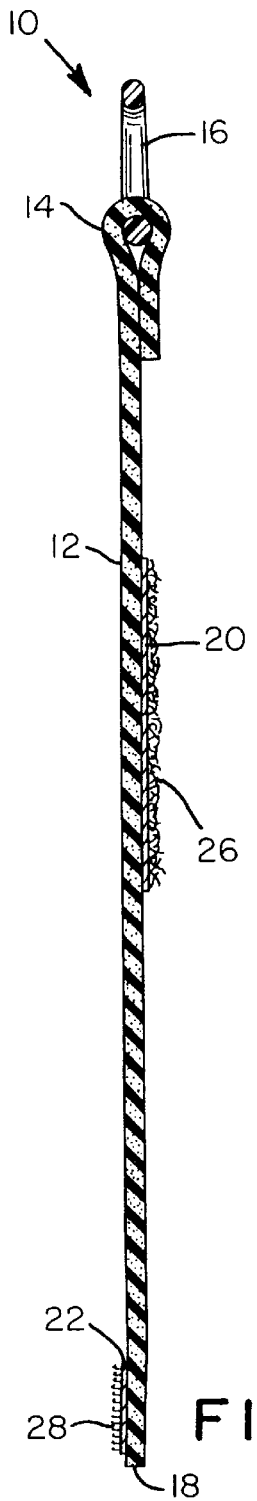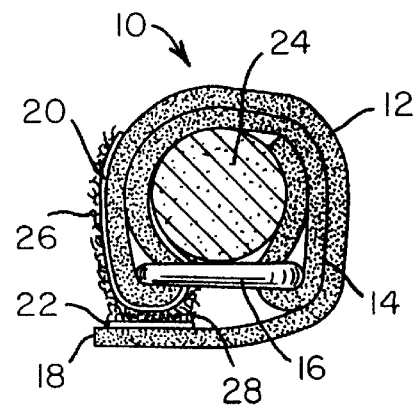

ADJUSTABLE TIE

FIELD OF THE INVENTION

The present invention relates generally to toilet articles and, in particular, to loop-type hair fasteners.

BACKGROUND OF THE INVENTION

Adjustable fasteners have long been used by women to bind locks of their hair in pony tails and the like. Typically, these fasteners have been made from elastic materials which adequately squeeze the individual strands of hair together into a bunch but which tend to slide when jostled. The problem is so significant that many women engaged in sports such as aerobics, swimming, and running often keep their hair cropped short rather than risk having to refasten it during lengthy practice sessions or during competitions. A need, therefore, exists for a device that will releasably bind the hair of a user yet will not slide along the hair strands once secured in place.

SUMMARY OF THE INVENTION

In light of the problems associated with the known hair fasteners, it is a principal object of the present invention to provide an adjustable tie that will releasably bind the hair of a user and will not slide along either wet or dry hair once secured in place.

It is another object of the invention to provide a tie for the purposes described which is buoyant so as to reduce the risk of loss by users involved in aquatic activities.

It is an object of the invention to provide improved elements and arrangements thereof in an adjustable tie for the purposes described which is lightweight in construction, inexpensive in manufacture, and dependable in use.

Briefly, the adjustable tie in accordance with this invention achieves the intended objects by featuring an elongated band of buoyant, elastomeric foam. A ring is secured to one end of the band. A first fastening portion, having a dense mat of uncut loops, is secured to the top surface of the band between the ends thereof. A second fastening portion is secured to the bottom surface of the band at the end opposite that bearing the ring. The second fastening portion has a number of hooks which are releasably fastenable with the loops of the first fastening portion. In use, the free end of the band is drawn around a lock of hair, through the ring and folded back upon itself to join the first and second fastening portions together and, thus, fasten the tie around a lock of hair.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a top plan view of an adjustable tie in accordance with the present invention.

FIG. 2 is a cross-sectional view taken along line 2—2 of FIG. 1.

FIG. 3 is a side view of the adjustable tie shown wrapped around a lock of hair.

Similar reference characters denote corresponding features consistently throughout the accompanying drawings.

DETAILED DESCRIPTION OF THE PREFERRED EMBODIMENT

Referring now to the FIGS., an adjustable tie in accordance with the present invention is shown at 10. The tie 10 includes an elastomeric band 12 which, at one end, is folded back and glued to itself so as to form a small loop 14. The loop 14 holds a ring 16 which is sized to receive the other, free end 18 of the band 12. Secured respectively to the top surface and bottom surface of the band 12 are cooperating hook-and-loop fastening portions 20 and 22 which may be utilized as described below to form the tie 10 into a loop of variable diameter.

The band 12 is formed from a flexible, stretchable material such as closed-cell, neoprene foam. Not only is neoprene foam waterproof, buoyant and resilient enough to mold around a lock of hair 24, but it also has a high coefficient of friction so that it will not readily slide along either a wet or dry lock of hair during use. The preferred band 12 is about 8 inches (20 cm) long, ¾ inch (1.9 cm) wide, and ⅛ inch (0.32 cm) thick.

The ring 16 is preferably formed of durable plastic. The ring 16 extends about 1 inch (2.5 cm) in the direction parallel to the longitudinal axis of the band 16 and extends about 1⅛ inches (2.9 cm) in the direction transverse to the longitudinal axis of the band. To reduce weight, the ring 16 tapers from 3/16 inch (0.48 cm) in thickness where it passes through the loop 14 to about ⅛ inch (0.32 cm) in thickness at its free end. Although the ring 16 is provided with a D-shaped configuration, it could also be O-shaped if desired.

The fastening portion 20 is secured to the top surface of the band 12 approximately midway between the ends thereof by means of a suitable glue. The fastening portion 20 comprises a strip of "Velcro" pile material including a dense mat of small, uncut loops 26 formed of thread. The fastening portion 20 has a width that is slightly less than that of the band 12 and a length of about 2 inches (5 cm).

By means of glue, the fastening portion 22 is secured to the bottom of the band 12 adjacent the free end 18 thereof. The fastening portion 22 comprises a strip of "Velcro" hook material having a plurality of transverse lines of hooks 28 spaced along its length. The ends of the hooks 28 are turned inwardly so as to catch in the loops 26 of the fastening portion 20 when the two fastening portions 20 and 22 are pressed together.

Preferably, the fastening portion 22 has a width that is slightly less than that of the band 12 and a length of about ½ inch (1.3 cm). Because the fastening portion 22 is shorter than the fastening portion 20, the fastening portion 22 may be fastened at various points along the length of the fastening portion 20 thereby permitting the tie 10 to be adjustably fastened around a lock of hair such as the one shown at 24. Thus, a single tie 10 dimensioned as described above can accommodate individuals having either thick or thin hair.

Using the tie 10 to bind the lock of hair 24 as illustrated in FIG. 3 is straightforward. First, the band 12 is wrapped around the lock of hair 24 with the fastening portion 20 facing inwardly toward the hair. The free end 18 of the band 12 is then drawn through the ring 16, and the band is stretched to the desired degree of tightness. Next, the band 12 is folded backwardly upon itself so that the fastening portion 22 is positioned closely adjacent the fastening portion 20. Now, by firmly pressing the fastening portion 22 against the fastening portion 20, the hooks 28 are caused to enter and grasp the loops 26 thereby coupling together the overlapping fastening portions 20 and 22.

Release of the interlocked fastening portions 20 and 22 is effected by grasping the free end 18 of the band 12 and pulling generally outwardly on the same. This will cause the hooks 28 and the loops 26 to disengage. The transverse line of disengagement will progress lengthwise of the interlocked fastening portions 20 and 22 so that they will separate smoothly. The tie 10 may now be easily stored and transported in a flat, ready-to-use condition.

While the invention has been described with a high degree of particularity, it will be appreciated by those skilled in the art that modifications may be made thereto. For example, closed-cell foam materials made from silicone, polyethylene, polyurethane, and the like may be substituted for the neoprene foam used to form the preferred band 12. Therefore, it is to be understood that the present invention is not limited to the sole embodiment described above, but encompasses any and all embodiments within the scope of the following claims.

I claim:

1. An adjustable tie, comprising:

an elongated band of elastomeric, closed-cell foam having a top surface, a bottom surface, a first end, and a second end opposite said first end, said first end being folded back and glued to itself so as to form a loop;

a D-shaped ring having a linear portion with opposed ends and an arcuate portion connecting said opposed ends, said linear portion being positioned within said loop;

a first fastening portion glued to said top surface of said elongated band between said first end and said second end thereof, said first fastening portion having a dense mat of small uncut loops; and, a second fastening portion glued to said bottom surface adjacent said second end of said elongated band, said second fastening portion having a plurality of hooks releasably fastenable with said loops of said first fastening portion.

* * * * *